US009569787B2

(12) United States Patent
Karlsson et al.

(10) Patent No.: US 9,569,787 B2
(45) Date of Patent: Feb. 14, 2017

(54) SYSTEMS AND METHODS FOR DISPLAYING DIGITAL CONTENT AND ADVERTISEMENTS OVER ELECTRONIC NETWORKS

(71) Applicant: AOL Advertising Inc., New York, NY (US)

(72) Inventors: Niklas Karlsson, Mountain View, CA (US); Jianlong Zhang, Sunnyvale, CA (US); Robert Alden Luenberger, Los Altos, CA (US); Scott Robert Strickland, Redwood City, CA (US); Yih-Shin Cindy Huang, Cupertino, CA (US); Seyed Mohammad Ziaemohseni, East Palo Alto, CA (US); Li Yang, Sunnyvale, CA (US); Hans W. Uhlig, Hayward, CA (US)

(73) Assignee: AOL Advertising Inc., New York, NY (US)

( * ) Notice: Subject to any disclaimer, the term of this patent is extended or adjusted under 35 U.S.C. 154(b) by 333 days.

(21) Appl. No.: 13/668,828

(22) Filed: Nov. 5, 2012

(65) Prior Publication Data

US 2013/0197994 A1 Aug. 1, 2013

Related U.S. Application Data

(60) Provisional application No. 61/591,826, filed on Jan. 27, 2012.

(51) Int. Cl.
*G06Q 30/02* (2012.01)

(52) U.S. Cl.
CPC ...... *G06Q 30/0241* (2013.01); *G06Q 30/0242* (2013.01)

(58) Field of Classification Search
CPC .................................................. G06Q 30/0246
USPC ...................................................... 705/14.45
See application file for complete search history.

(56) References Cited

U.S. PATENT DOCUMENTS

| | | | |
|---|---|---|---|
| 6,990,462 | B1 | 1/2006 | Wilcox et al. |
| 7,546,625 | B1 | 6/2009 | Kamangar |
| 2001/0020236 | A1 | 9/2001 | Cannon |
| 2003/0171990 | A1 | 9/2003 | Rao et al. |
| 2004/0088241 | A1 | 5/2004 | Rebane et al. |

(Continued)

OTHER PUBLICATIONS

The Value of Landing Pages, Aug. 31, 2009, Entire Document.*

(Continued)

*Primary Examiner* — Namrata Boveja
*Assistant Examiner* — Michael Ezewoko
(74) *Attorney, Agent, or Firm* — Finnegan, Henderson, Farabow, Garrett & Dunner, L.L.P.

(57) ABSTRACT

System and methods are provided for analyzing and displaying digital content and advertisements over electronic networks. In accordance with one implementation, a method is provided that calculates, using at least one processor, an engagement metric (including, for example, click probability) for a specific combination of time, promotion slot, and user segment, for an individual promotion of a set of promotions, and calculates a value of a landing page associated with the promotion. The method then can multiply the engagement metric and the value to determine the valuation of the promotion. The method can operate recursively by using previous calculations in later runs of the same method.

29 Claims, 6 Drawing Sheets

(56) References Cited

U.S. PATENT DOCUMENTS

| | | | | |
|---|---|---|---|---|
| 2005/0021403 | A1 | 1/2005 | Ozer et al. | |
| 2005/0097204 | A1* | 5/2005 | Horowitz et al. | 709/223 |
| 2006/0041480 | A1 | 2/2006 | Briggs | |
| 2006/0074749 | A1 | 4/2006 | Kline et al. | |
| 2006/0206355 | A1 | 9/2006 | Cheung et al. | |
| 2006/0253319 | A1 | 11/2006 | Chayes et al. | |
| 2006/0280382 | A1 | 12/2006 | Cheng et al. | |
| 2006/0282533 | A1 | 12/2006 | Steelberg et al. | |
| 2007/0006145 | A1 | 1/2007 | Hill et al. | |
| 2007/0027761 | A1 | 2/2007 | Collins et al. | |
| 2007/0033105 | A1 | 2/2007 | Collins et al. | |
| 2007/0038508 | A1* | 2/2007 | Jain et al. | 705/14 |
| 2007/0038509 | A1 | 2/2007 | Jain et al. | |
| 2007/0067267 | A1 | 3/2007 | Ives | |
| 2007/0078707 | A1 | 4/2007 | Axe et al. | |
| 2007/0088605 | A1 | 4/2007 | Ghate et al. | |
| 2007/0124194 | A1 | 5/2007 | Barnette et al. | |
| 2007/0130009 | A1 | 6/2007 | Steelberg et al. | |
| 2007/0130014 | A1 | 6/2007 | Altberg et al. | |
| 2007/0162296 | A1 | 7/2007 | Altberg et al. | |
| 2007/0174114 | A1 | 7/2007 | Bigby et al. | |
| 2007/0265923 | A1 | 11/2007 | Krassner et al. | |
| 2007/0283388 | A1 | 12/2007 | Del Beccaro et al. | |
| 2008/0021791 | A1 | 1/2008 | Steelberg et al. | |
| 2008/0126240 | A1 | 5/2008 | Banbury et al. | |
| 2008/0162200 | A1 | 7/2008 | O'Sullivan et al. | |
| 2008/0215418 | A1 | 9/2008 | Kolve et al. | |
| 2008/0275757 | A1 | 11/2008 | Sharma et al. | |
| 2009/0006145 | A1 | 1/2009 | Duggal et al. | |
| 2009/0037267 | A1 | 2/2009 | Duggal et al. | |
| 2009/0099904 | A1 | 4/2009 | Affeld et al. | |
| 2009/0157507 | A1* | 6/2009 | Agius et al. | 705/14 |
| 2009/0210287 | A1 | 8/2009 | Chickering et al. | |
| 2009/0248513 | A1* | 10/2009 | Aggarwal | G06Q 30/02 705/14.72 |
| 2010/0094878 | A1 | 4/2010 | Soroca et al. | |
| 2010/0138291 | A1 | 6/2010 | Silverman et al. | |
| 2010/0262455 | A1 | 10/2010 | Karlsson et al. | |
| 2010/0262497 | A1 | 10/2010 | Karlsson | |
| 2010/0262499 | A1 | 10/2010 | Karlsson et al. | |
| 2011/0131099 | A1 | 6/2011 | Shields et al. | |
| 2011/0238466 | A1 | 9/2011 | Haumont et al. | |
| 2011/0246267 | A1* | 10/2011 | Williams et al. | 705/14.4 |
| 2011/0276411 | A1 | 11/2011 | Mcelfresh et al. | |
| 2012/0030011 | A1* | 2/2012 | Rey | G06Q 30/0242 705/14.43 |
| 2012/0150656 | A1 | 6/2012 | Karidi et al. | |
| 2014/0046777 | A1 | 2/2014 | Markey et al. | |

OTHER PUBLICATIONS

Chomsky: Ideas and Ideals, Neil Smith, Cambridge University Press, 1999, p. 12.*

Internet Archive version of "9.6. random—Generate pseudo-random numbers," https://docs.python.org/3.1/library/random.html; Mar. 26, 2010 (15 pages).

"On the Failure of Linkage Principle with Financially Constrained Bidders: An Example" Dec. 13, 2000, by Fang et al. (24 pages).

International Search Report and Written Opinion issued in PCT/US2010/030341 on Oct. 4, 2010 (16 pages).

International Search Report and Written Opinion issued in PCT/US2010/030343 on Oct. 7, 2010 (9 pages).

International Search Report and Written Opinion issued in PCT/US2010/030347 on Oct. 8, 2010 (6 pages).

Jiang, et al., "Estimating Bidders Valuation Distribution in Online Auctions," University of British Columbia, 2005 (16 pages).

International Search Report and Written Opinion, issued for PCT/US14/57747, mailed on Apr. 13, 2015 (14 pages).

International Search Report and Written Opinion for PCT/US2013/022881, mailed Mar. 29, 2013 (10 pages).

Search History for PCT Application No. PCT/US2013/022881, dated Mar. 13, 2013 (6 pages).

Google Analytics, "The Value of Landing Pages," Aug. 31, 2009 (9 pages).

Office Action mailed May 3, 2016, in U.S. Appl. No. 14/068,328 (15 pages).

* cited by examiner

SYSTEMS AND METHODS FOR DISPLAYING DIGITAL CONTENT AND ADVERTISEMENTS OVER ELECTRONIC NETWORKS

CROSS REFERENCE TO RELATED APPLICATIONS

This application claims the benefit of U.S. Provisional Application 61/591,826, filed Jan. 27, 2012, the disclosure of which is expressly incorporated herein by reference in its entirety.

TECHNICAL FIELD

The present disclosure relates generally to systems and methods for displaying digital content and advertisements to users over an electronic network, such as the Internet. More particularly, and without limitation, the present disclosure relates to systems and methods for analyzing online advertisements and content, and selecting combinations of online advertisements and content for display to users over the Internet or other electronic networks. Furthermore, and similarly without limitation, the present disclosure also relates to determining and presenting content that is most attractive to users, and doing so while addressing budget requirements of individual content campaigns.

BACKGROUND

Many publishers of content on the Internet tend to be dependent upon advertising for revenue. For example, various types of websites, blogs, social networks, and web-based service sites use advertising as a significant source of income to offset the costs associated with offering content and/or services to their users. When a user requests a specific web page, a corresponding web server—either alone or in conjunction with other servers—may identify advertisements (or other content) to be displayed as part of the web page. For example, a server may attach instructions for a client computer to request an appropriate advertisement from an ad server. Additionally, or alternatively, instructions may be provided to insert an image or other content associated with the ad into the web page.

News websites are one type of website that rely on advertisements for generating revenue. Such sites may provide various pieces of electronic content for users, including articles, editorials, and/or videos, for example. The content may be independently generated by staff writers and/or compiled from other sources. On news websites and other content-rich sites, care is often taken to deliver relevant advertisements to users who are reading or viewing the content on the website. Additionally, with the variety of advertisements used on the Internet, it is important to determine the most profitable types of advertisements to present to users that visit the website, and to quickly and reliably determine the content that will be the most attractive to such users.

In view of the foregoing, there is a need for improved systems and methods for analyzing and optimizing online advertisements and content for a website. Moreover, there is a need for improved systems and methods for selecting combinations of advertisements and content based on numerous criteria to maximize, for example, ad revenue or unique user visits to a website. There is also a need for such systems and methods that can address the needs or goals of ad promotions and/or budget constraints.

BRIEF DESCRIPTION OF THE DRAWINGS

The accompanying drawings, which are incorporated in and constitute part of this specification, and together with the description, illustrate and serve to explain the principles of various exemplary embodiments.

DETAILED DESCRIPTION

Figure 1:
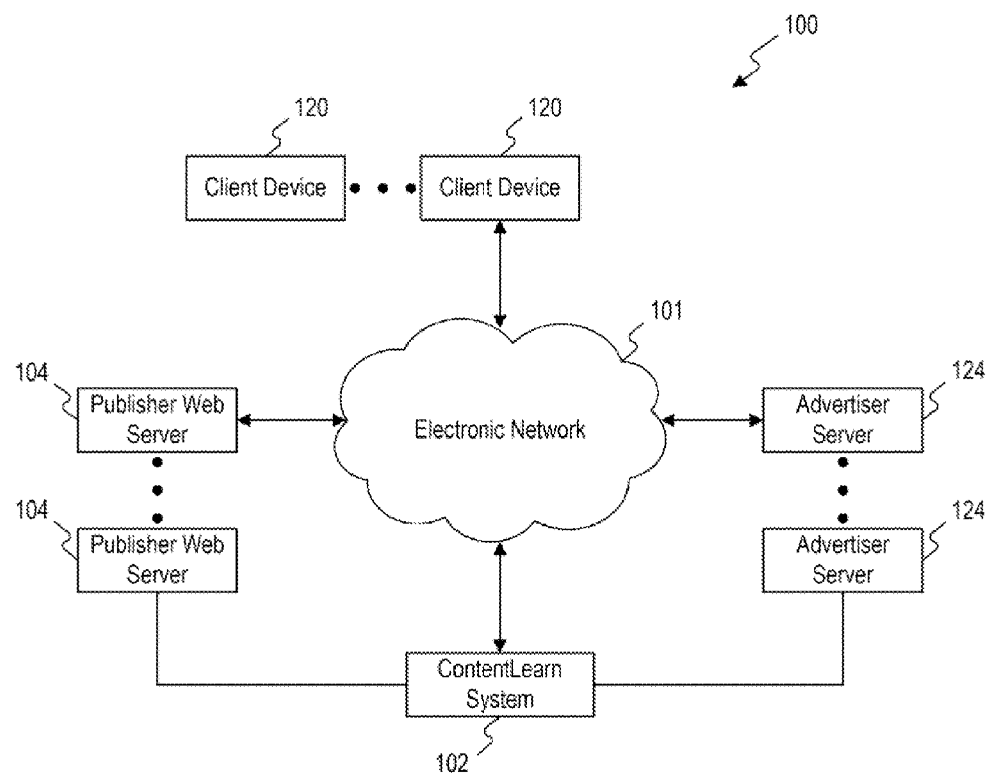
FIG. 1 is a diagram of an exemplary computerized system 100 for implementing embodiments consistent with the present disclosure.

Reference will now be made in detail to exemplary embodiments of the invention, examples of which are illustrated in the accompanying figures/drawings. Wherever possible, the same reference numbers will be used throughout the drawings to refer to the same or like parts.

Before explaining certain embodiments of the disclosure in detail, it is to be understood that the disclosure is not limited in its application to the details of construction and to the arrangements of the components set forth in the following description or illustrated in the drawings. Embodiments consistent with the present disclosure are not limited to those described herein and encompass variations in addition to those described and can be practiced and carried out in various ways. Also, it is to be understood that the phraseology, terminology, and structure employed herein, as well as in the accompanying drawings, claims, and description, are for the purpose of explanation and example, and should not be regarded as limiting.

As such, those skilled in the art will appreciate that the conception upon which this disclosure is based may readily be utilized as a basis for designing other structures, methods, and systems for carrying out the several purposes of the present disclosure or any other purpose.

Embodiments consistent with the present disclosure include computer-implemented methods, tangible non-transitory computer-readable mediums, and computer-implemented systems. Computer-implemented methods consistent with the present disclosure may be executed, for example, by a processor that receives instructions from a non-transitory computer-readable storage medium. Similarly, systems consistent with the present disclosure may include at least one processor and memory, and the memory may be a non-transitory computer-readable storage medium.

As used herein, a non-transitory computer-readable storage medium refers to any type of physical memory on which information or data readable by a processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums.

As referred to herein, a "memory" may comprise any type of computer-readable storage medium unless otherwise specified. A computer-readable storage medium may store instructions for execution by a processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

FIG. 1 illustrates a diagram of an exemplary computerized system 100 for implementing embodiments consistent with the present disclosure. As shown in FIG. 1, system 100 may include one or more client devices 120, one or more publisher web servers 104, one or more advertiser servers 124, and a ContentLearn system 102, any or all of which may be provided in communication with electronic network 101. Although not shown in FIG. 1, system 100 may include systems and methods for analyzing or valuating advertisements, based on various combinations of advertising elements and content. Electronic network 101 may be, for example, a wired communication system, a wireless communication system, a local- or wide-area network, the Internet, or any combination thereof.

Any of the servers or computer systems of system 100 may be disposed in communication with each other via electronic network 101, or any other public or private network. Client devices 102 may each interact with advertiser servers 124 and/or publisher web servers 104 through computers connected to electronic network 101, or through mobile communications devices, such as mobile phones and personal digital assistants (PDAs).

Consistent with embodiments of the present disclosure, system 100 may be configured to implement and execute any of the exemplary methods and features disclosed herein. For example, the ContentLearn system 102 may be configured to facilitate the choice of content-user combinations and optimize the selection of content allocation. Optimization, as will be described later with reference to the accompanying drawings, may comprise one or more of optimizing revenue by driving users to particular high-value landing pages, optimizing click-through-rate by presenting content promotions that are likely to generate clicks or return visits, optimizing the time spent on a web page, optimizing other user engagement metrics, and combinations or modifications thereof.

ContentLearn system 102 may also be configured to implement the exemplary disclosed valuation features, including those for valuing landing pages, promotions, and particular paths through landing pages. Landing pages, in accordance with some embodiments, may comprise any type of web page, such as pages comprising news stories, editorials, documents, videos, advertisements, photo galleries, games, etc. In some embodiments, a landing page may be any item to which a promotion refers to. Exemplary valuation features and embodiments are disclosed herein with reference to FIGS. 4A and 4B. In some embodiments, these valuation features are performed recursively so as to continually reinterpret data, such as click-through-rate (CTR) and the valuation output.

In some embodiments, ContentLearn system 102 may be configured to manage "volume spikes" by promoting a number of high-performing or high-value content promotions, rather than a single content promotion. Promoting a single promotion alone could lead to a traffic spike directed to the landing page associated with that promotion, overrunning the budget allocated to that promotion. By displaying multiple high-performing or high-value promotions to users, traffic can be driven to landing pages where a particular content promotion (e.g. an advertisement) would otherwise expire without fulfilling its budget.

The term "promotion," as used in this disclosure refers to any type of electronic data. This includes, but is not limited to, stories, editorials, links (i.e. links to another content/promotion on the same website or on another website), videos, and other types of electronic content. A "promotion" may also refer to an advertisement or advertising elements. Thus, while some embodiments may be described in terms of advertisements and/or content, the term can, in some embodiments, be understood by those of skill in the art to mean any of the above as well as equivalents.

In one exemplary embodiment, client devices 120 may interact with publisher web servers 104 and/or advertiser servers 124. The publisher web servers 104 and/or the advertiser servers 124 may also interact with the ContentLearn system 102. All such communication may be performed via electronic network 101. Electronic Network 101 may be, in some embodiments, the Internet, but may in other embodiments comprise any number and configuration of different types of networks—such as an intranet, a Local Area Network (LAN), a Wide-Area Network (WAN), a Metropolitan-Area Network (MAN), or the like.

Figure 2:
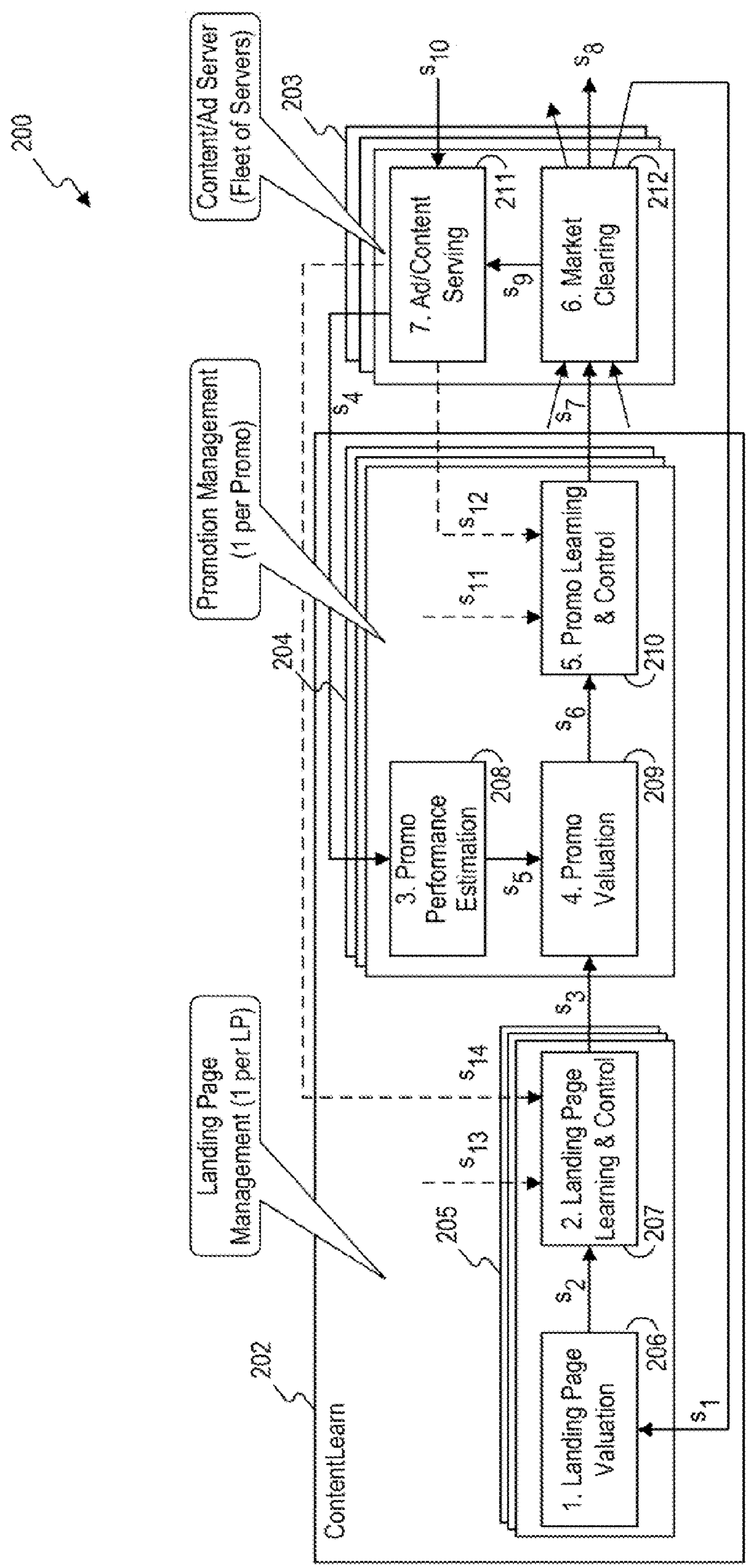
FIG. 2 is a block diagram of an exemplary architecture 200, including ContentLearn module 202, which may be implemented by one or more computers, servers, or portable electronic devices, such as those depicted in FIG. 1.

FIG. 2 illustrates a diagram of an exemplary architecture 200. As shown in FIG. 2, architecture 200 may include one or more computerized modules, such as ContentLearn Module 202 and Ad/Content Serving Module 203. The ContentLearn module 202 (and thus, its component modules and other parts) may be implemented by one or more computers, servers, or portable electronic devices. In one embodiment, ContentLearn module 202 may be implemented by ContentLearn system 102. Also, Ad/Content Serving Module 203 may be implemented by one or more advertising servers 124. In some embodiments, Ad/Content Serving Module 203 may be implemented as a single server; however, in other embodiments, Ad/Content Serving Module 203 may be separated into multiple devices based on type (e.g., separating advertisement serving modules from content serving modules). As will be appreciated from this disclosure, these systems may, in some embodiments, operate on streaming (or "continuous") data. Additionally, or alternatively, these systems may process sampled (or "cached" or "stored") data.

The modules in FIG. 2, in some embodiments, represent a recursive system. That is, the $s_1$ data utilized by Landing Page Valuation Module 206 may be obtained in part from Market Clearing Module 212, which obtains its input ($s_7$) from Promo Learning & Control Module 210, which in turn obtains its input ($s_6$) from Promo Valuation Module 209, etc., which in turn leads back to the output from Landing Page Valuation 206 ($s_2$). Thus, in some embodiments, initial (or "starter" or "simulation") data can be used to seed or initiate the initial execution of Landing Page Valuation Module 206 with respect to a landing page. As the modules in FIG. 2 operate, the aspects being estimated by each module can become more accurate leading to better impression decisions. This is because of the recursive processing of, for example, actual impressions and clicks by users.

ContentLearn Module 202, in some embodiments, is composed of Promotion Management Module 204 and Landing Page Management Module 205. Modules 204 and 205 may be composed of various computerized modules or components as well, some of which may be used to estimate a monetary value of users navigating to landing pages, adjust estimated landing page values to achieve goals (e.g., budgeting, traffic, or the like), adjust estimated landing page values to avoid traffic spikes, estimate click probability, estimate the value of a particular promotion, and adjust the promotion value using feedback control mechanisms.

As part of Landing Page Management Module 205, Landing Page Valuation Module 206, in some embodiments, may recursively calculate an estimate for a landing page's value (monetary, business, or otherwise). This value may be based on the users in a particular user segment navigating to that page. This value may also be based on market clearing prices calculated as a result of calculations made by the other modules in FIG. 2; for example, $s_1$—representing clearing prices and allocations—may come from Market Clearing Module 212, which may recursively calculate this value based on previous impressions and clicks. However, in the absence of data, for simulation purposes, or otherwise, the value may be based on pre-stored data or simulation data. This value may be provided as output, which is represented in FIG. 2 as $s_2$.

In some embodiments, the calculation of $s_2$ involves the following formulas, for each time sample and user segment k:

$$x_1(0) = 0$$

$$x_2(0) = 0$$

$$\begin{bmatrix} x_1(t+1) \\ x_2(t+1) \end{bmatrix} = \lambda \begin{bmatrix} x_1(t) \\ x_2(t) \end{bmatrix} + (1-\lambda) \begin{bmatrix} v(t) \\ (v(t) - x_1(t))^2 \end{bmatrix};$$

$$v(t) = \sum_{\forall \text{ objects } i \text{ on } LP} a_i(t) b_i(t);$$

and $$s_2(t) = \begin{bmatrix} x_1(t) \\ \sqrt{x_2(t)} \end{bmatrix};$$

such that $a_i(t)$ represents clearing prices;

$b_i(t)$ represents allocations of promotions to promotion slots;

$\lambda$ represents a configuration parameter or weight, for controlling how much the previous estimate should be favored versus how much weight to give to the most recent measurement;

$$\begin{bmatrix} x_1(t) \\ x_2(t) \end{bmatrix}$$

represents the landing page value ($x_1$ is the point estimate of the value and $x_2$ is an uncertainty estimate of the point estimate); and objects i on LP represents all promotion slots present on a particular Landing Page (LP).

In some embodiments, the initial data that arrives to Landing Page Valuation Module 206 is initialized with seed data or blank data.

An additional part of Landing Page Management Module 205 may be Landing Page Learning & Control Module 207. Module 207 may be used, in some embodiments, to adjust landing page values calculated using Landing Page Valuation Module 206. As input, Landing Page Learning & Control Module 207 may take, in some embodiments, the values calculated by Landing Page Valuation Module 206; that is, the monetary values for particular landing pages (represented by $s_2$). Module 207 may also take as input, for example, a desired number of views for those pages (represented by $s_{13}$), an observed number of views for those pages (represented by $s_{14}$), or other parameters that enable finer control of traffic to individual landing pages. These parameters may be directly input by, for example, editors or other users, or may be received from other Modules; for example, from Module 211. The output of Module 207 is represented in FIG. 2 as $s_3$.

In some embodiments, $s_3$ is calculated using the following formulas (using the same key for variables mentioned previously):

$$x(o)=x_0, \text{ i.e., } 0$$

$$x(t+1)=\min(x)(t)+\alpha(y_{ref}(t)-y(t)),0);$$

$$\tilde{v}_{LP}(t)=v_{LP}(t)+x(t);$$

$$\tilde{u}_{LP}(t)=u_{LP}(t); \text{ and}$$

$$s_3(t) = \begin{bmatrix} \tilde{v}_{LP}(t) \\ \tilde{u}_{LP}(t) \end{bmatrix};$$

such that $\alpha$ represents the desired gain in views for the Landing Page;

$y_{ref}(t)$ represents the desired maximum number of page views for the Landing Page;

$y(t)$ represents the observed number of page views so far for the Landing Page; and $$\begin{bmatrix} v_{LP}(t) \\ u_{LP}(t) \end{bmatrix}$$

represents the data input as $s_2$ from Landing Page Valuation Module 206.

As part of Promotion Management Module 204, Promo Performance Estimation Module 208, in some embodiments, can be used to recursively estimate engagement metrics—for example, the click probability of a particular promotion (e.g., a link to content or an ad) in a given place for a given type of user. In some embodiments, engagement probability of a particular promotion can be calculated as well (e.g. impression data, interaction data, or the like). In FIG. 2, Module 204 is represented as having multiple instances—this is because each representation of Module 204 (and the Modules inside of Module 204) is tied to a single promotion. However, in some embodiments, Module 204 may represent more than one promotion. As input in some embodiments, Promo Performance Estimation Module 208 uses previous (or "historical") impression data and click volume data to generate click probability of a particular promotion in a particular place for a specific type of user. This may be received from Ad/Content Serving Module 211, as represented in FIG. 2 by $s_4$. In some embodiments, the "particular place" could be a particular landing page (e.g. a webpage) or a particular position on the landing page itself. The type of user would be determined based on user segments. For example, in some embodiments, users could be divided into segments based on age, gender, geographic location, state, metropolitan area, country, city, town, behavioral attributes, income, or any other attribute that can uniquely or non-uniquely identify a user or group of users. The output of Promo Performance Estimation Module 208—that is, estimated click probability of a specific promotion by a user in a specific segment while the promotion is in a particular place—may, in some embodiments, be sent to Promo Valuation Module 209 as $s_5$.

In some embodiments, $s_5$ may be calculated based on the following formulas:

$$y_i = \log\left(\frac{n_C(t_i)+0.5}{n_I(t_i)-n_C(t_i)+0.5}\right),\ i = n-m+1 \text{ to } n;$$

$$v_i = \frac{1}{(n_C(t_i)+0.5)} + \frac{1}{n_I(t_i)-n_C(t_i)+0.5},\ i = n-m+1 \text{ to } n;$$

$$Y = \begin{bmatrix} y_{n-m+1} \\ y_{n-m+2} \\ \cdots \\ y_n \end{bmatrix};$$

$$W_1 = \begin{bmatrix} v_{n-m+1}^{-1} & 0 & \cdots & 0 \\ 0 & v_{n-m+2}^{-1} & & 0 \\ \vdots & & \ddots & 0 \\ 0 & 0 & & v_n^{-1} \end{bmatrix};$$

$$W_2 = \begin{bmatrix} \lambda^{m-1} & 0 & \cdots & 0 \\ 0 & \lambda^{m-2} & & 0 \\ \vdots & & \ddots & \vdots \\ 0 & 0 & & 1 \end{bmatrix};$$

$$W_3 = \begin{bmatrix} 0 & 0 \\ 0 & a \end{bmatrix};$$

$$X = \begin{bmatrix} 1 & t_{n-m+1}-t_0 \\ 1 & t_{n-m+2}-t_0 \\ \vdots & \vdots \\ 1 & t_n-t_0 \end{bmatrix};$$

$$\hat{\theta} = (X^T W_1 W_2 X + W_3)^{-1} X^T W_1 W_2 Y;$$

$$\hat{y}(t_n+1) = [1,\ t_{n+1}-t_0]\hat{\theta};$$

$$\hat{p}(t_{n+1}) = \frac{e^{\hat{y}(t_n+1)}}{1+e^{\hat{y}(t_n+1)}};$$

$$\hat{E} = Y - X\hat{\theta};$$

$$\hat{\sigma}_\epsilon^2 = \frac{\hat{E}^T \hat{E}}{(m-1)};$$

$$\Sigma_{\hat{\theta}} = \hat{\sigma}_\epsilon^2 (X^T W_1 W_2 X)^{-1};$$

-continued $$\hat{\sigma}_p^2 = \frac{e^{2\hat{y}(t_n+1)}}{(1+e^{2\hat{y}(t_n+1)})\hat{}4}[1,\ t_{n+1}-t_0]\Sigma_{\hat{\theta}}\begin{bmatrix} 1 \\ t_{n+1}-t_0 \end{bmatrix};$$

and $s_5=[\hat{p}(t_{n+1}),\sigma_\epsilon^2]^T$; such that $n_I(t_n)$ represents historical impression data at time $t_n$;

$n_C(t_n)$ represents historical click data at time $t_n$;

m represents a look-back window; and n represents the most recent measurement.

The look-back window, represented by m, may be used a tuning parameter, and may be an integer value larger than 0 (though other configurations are possible). For example, m=24 could represent a desire to utilize the most recent 24 data input values. If measurements are received once per hour, then m=24 would represent the most recent 24 hours. n, or the most recent measurement, is used to represent the time stamp associated with the most recent measurements.

Promo Valuation Module 209, in some embodiments, receives both the click probability, or other engagement metric, for a specific promotion generated by Promo Performance Estimation Module 208 (represented by $s_5$) and the estimated landing page value from Landing Page Learning & Control Module 207 (represented by $s_3$). Using these inputs, Promo Valuation Module 209 may estimate the monetary value of a given promotion, in a given place on a landing page, for a specific segment of users. This may be done using streaming data, sampled data, or the like. The output—i.e., the estimated monetary value of the promotion/user/location combination—is represented as $s_6$ in FIG. 2 and is passed to Promo Learning & Control Module 210.

In some embodiments, $s_6$ may be calculated based on the following formulas:

$$v_{promo}(t)=\tilde{v}_{LP}(t)\hat{p}(t);$$

$$u_{promo}(t)=\tilde{u}_{LP}(t)e^{\hat{\sigma}_\epsilon(t)};\text{ and}$$

$$s_6(t) = \begin{bmatrix} v_{promo}(t) \\ u_{promo}(t) \end{bmatrix};$$

such that $\tilde{v}_{LP}(t)$ represents an adjusted landing page point estimate value, as described above; and $\tilde{u}_{LP}(t)$ represents the an uncertainty estimate of the landing page point estimate, as described above.

Promo Learning & Control Module 210 receives the estimated monetary value $s_6$, and also receives other values useful in achieving impression goals. For example, module 210 may receive a total number of impressions to be displayed for a particular promotion (represented as $s_{11}$), as well as the number of impressions that have already been achieved (represented as $s_{12}$ and received from Ad/Content Serving Module 211). From this, Promo Learning & Control Module 210 may determine adjustments to the estimated monetary value $s_6$ in order to achieve desired impression goals. By way of example, if a promotion is nearing the end of its maximum number of impressions, module 210 may increase the value or decrease it in order to guarantee a level of clicks on the promotion (again, for example, in order to meet budget for that promotion) or a certain amount of engagement. This will be further explained with respect to module 212. As output, Promo Learning & Control Module 210 may export a bid for the particular promotion as $s_7$.

In some embodiments, $s_7$ may be calculated based on the following formulas:

$$x(0)=x_0;$$

$$x(t+1)=\min(x(t)+\alpha(y_{ref}(t)),0);$$

$$\hat{v}_{promo}(t)=v_{promo}(t)+x(t);$$

$$\hat{u}_{promo}(t)=\beta u_{promo}(t)^2; \text{ and}$$

$$s_7(t)=\begin{bmatrix}\hat{v}_{promo}(t)\\ \hat{u}_{promo}(t)\end{bmatrix};$$

such that $\alpha$ represents a controller parameter dictating how aggressive the controller should be to regulate delivery;

$\beta$ represents a controller parameter dictating how much additional uncertainty of estimates should be considered;

$y_{ref}(t)$ represents a sold number of impressions;

y(t) represents an observed number of impressions; and $$\begin{bmatrix}\hat{v}_{promo}(t)\\ \hat{u}_{promo}(t)\end{bmatrix}$$

represent "price" and "uncertainty" bids,

Ad/Content Serving Module 203 may include at least one server; however, in some embodiments, multiple servers may be used to implement module 203. In some embodiments, for example, Ad/Content Serving module 211 may be implemented with separate servers for each type of data they push (e.g., a fleet or cluster of Ad servers and a fleet or cluster of Content servers).

Market Clearing Module 212 receives multiple bids as $s_7$. These may be the bids submitted by content/advertisements that are eligible to be shown in response to the appropriate impression request. Using an impression-based market clearing algorithm, Market Clearing Module 212 may select a promotion to serve on the impression request, also known as the "winning promotion" for that impression request, (represented as $s_9$), based upon the price and uncertainty bids in $s_7$. Market Clearing Module 212 may then, for example, report the price that the promotion was cleared and served at (represented as $s_5$), which is then sent back to Landing Page Valuation Module 206 for the next operation of that Module. Other information may be reported in the form of $s_8$ as well—e.g., information about user segment, category of the promotion served, promotion slot/location/site information, or the like.

Ad/Content Serving Module 211 may accept a multitude of inputs in serving the chosen promotion(s). (Module 211 is represented in FIG. 1 as Advertising Server 124.) First, Module 211 may accept the promotion selected by Market Clearing Module 212 (represented by $s_9$), and serve it to the user that effected the impression request by attempting to browse to a landing page. The user's interaction, in turn, may be received; that is, how or whether the user interacts with the promotion (represented as $s_{10}$). In the example of a static advertisement, for example, user engagement may comprise determining whether the user clicks on the advertisement. In other embodiments, however, measuring any interaction with a particular promotion is possible (e.g., completing an online form, converting an advertisement, reading content).

After receiving user interaction from the served promotion, Ad/Content Serving Module 211 may then report results on the promotion's performance. For example, Ad/Content Serving Module 211 may report the engagement information on the promotion, such as impression data, click data, engagement data, or the like. This information (represented as $s_4$) may be passed back to Promo Performance Estimation Module 208; as described earlier with respect to Module 208, this information may be used to assist in estimating the probability that a particular promotion will be clicked by a particular user at a particular time, while on a particular landing page.

Ad/Content Serving Module 211 may also report the observed number of impressions and clicks of the promotion and the observed number of Landing Page views, represented in FIG. 2 as $s_{12}$ and $s_{14}$, respectively. In some embodiments, the observed number of impressions may be used by Landing Page Learning & Control Module 207 in order to adjust the estimated landing page value, to achieve goals such as a desired level of traffic. Additionally, in some embodiments, information on the observed number of Landing Page views, impressions, or clicks (or other information) may be used by Promo Learning & Control Module 210 in order to adjust the estimated promotion value to achieve goals such as a desired number of clicks on the promotion. However, these particular uses are merely exemplary; other uses and other information are possible.

Figure 3:
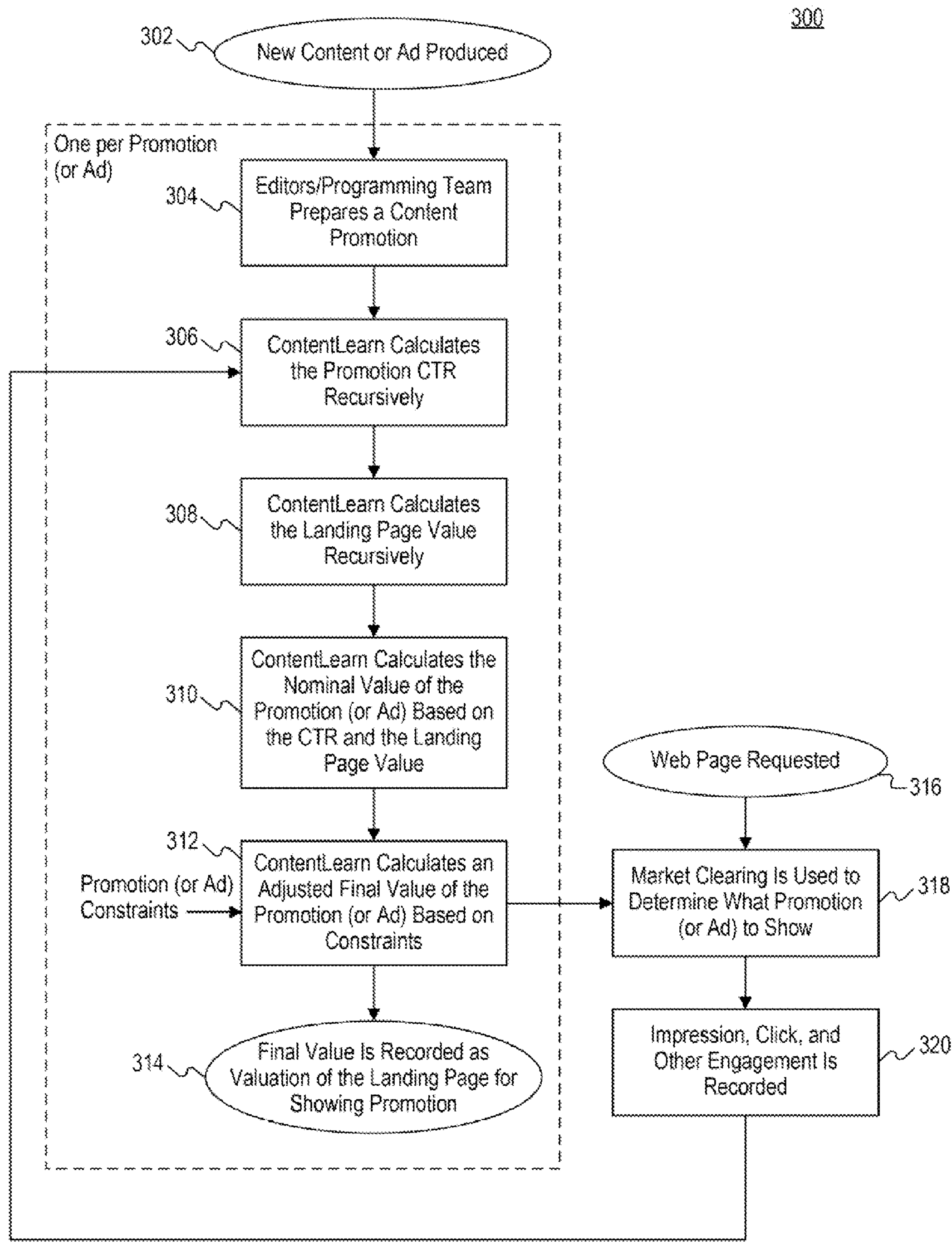
FIG. 3 illustrates a flow chart of an exemplary method 300, consistent with disclosed embodiments of the present disclosure.

FIG. 3 is a flow chart of an exemplary method 300, consistent with disclosed embodiments of the present disclosure. The steps represented in method 300 are similar to those as explained above with respect to the modules in FIG. 2, but may be performed by the same number or a different number of modules, or may be performed partially or fully in place of the operations explained with respect to FIG. 2, or may be used to supplement the operations explained with respect to FIG. 2.

Method 300 begins with the production of a new promotion (e.g., a content promotion or advertisement) in step 302. This may involve the production of such a promotion on a local website, an owned-and-operated (O&O) website, or any other website (including, for example, a website upon which advertising/content space has been purchased—such as a partner company's website). In addition, the step represented by block 302 may comprise producing multiple advertisements/pieces of content for use on any of the above mentioned spaces/locations.

Method 300, after producing the content in block 302, may then proceed to block 304. The steps in blocks 304-314 may, in some embodiments, be effected on a one-per-promotion (or per-ad) basis, such that each of the contents/advertisements produced in block 302 may be operated upon in this set of blocks.

Block 304 represents a team creating a content promotion that may contain one of the contents/advertisements created in block 302, as may be determined using later steps of FIG. 3. This "content promotion" created in block 304 may comprise a particular space on a particular web page, a particular space on a number of web pages, or any other space that can be used to house either or both of a content promotion or advertisement.

Block 306 may calculate, after preparation of a content promotion in 304, a click-through rate (or other engagement metric) for the prepared content promotion. The click-through rate may be calculated, as mentioned before, based on a particular promotion in a given place for a given type of user. This may be based on the user's membership in a particular group (e.g., based on demographics). The calculation of the click-through rate may be calculated based on information from block 320, involving impression, click, and/or other engagement data for particular promotions in particular promotion slots. (Block 320 will be described below more fully.) This information may be used in later calculations; for example, in blocks 310 and 312. Additionally, while the phrase "click-through rate" is used throughout the disclosure, calculations of other engagement metrics may also be performed and utilized in similar ways.

Method 300 may then proceed to block 308, where a value for the landing page linked to by the particular promotion is calculated. The value may be based, in some embodiments, on a recursive valuation calculation. Some exemplary embodiments of calculating this value are described herein with reference to FIGS. 4A and 4B.

After calculating the value of the landing page in block 308, method 300 may then proceed to block 310, for calculating the value of the particular promotion/ad, based on the landing page value (calculated in block 308) and the click-through rate of the promotion (calculated in block 306). This calculated value may be monetary in nature. Additionally, as it is based on calculations involving particular user groups, promotions, and promotion slots, the calculated value may indicate the value based on that combination of user group/promotion/promotion slot or placement. As an example, the value of the promotion may be calculated by multiplying the landing page value by the click-through rate. So, if the landing page value is calculated as $2.00, and the click-through rate, or the probability that a user in a particular segment will go to the landing page is 5% (or 0.05), then the value of the promotion leading to the landing page is $2.00*5%, or 10 cents ($0.10).

Method 300 may then proceed, after calculating the value of the promotion/ad, to adjust the value of the promotion/ad in block 312. For example, adjustments can be made to the promotion/ad value based on budgets, impression requirements, or other constraints. In some embodiments, these adjustments may be manually implemented by a human operator or administrator. Additionally, or alternatively, these adjustments may be automatic adjustments or constraints to meet goals.

After adjusting the final value in block 312, method 300 may continue to block 314 for recording the value as part of determining a valuation for the landing page that contains the promotion (as opposed to the landing page that the promotion links to). This information can be used later in recursively calculating the value of that landing page.

Method 300 also demonstrates how the value calculated in block 312 may be utilized in presenting the particular promotion. When a web page is requested in block 316, the requested web page may contain at least one promotional slot for inserting a promotion, such as one of the promotions created in block 302 and operated on in blocks 304-314. Method 300 may then proceed to block 318, where a market clearing process (see, e.g., block 212) may execute to determine which promotion should be presented to the user requesting the web page. This may be done, in some embodiments, once for each promotion slot. So, while one arrow is shown from block 312 to block 318, the method as represented in block 318 may be effected using data from multiple promotions.

After presenting one or more promotions to the user in one or more promotion slots, engagement data with those promotions (e.g. impression data, click data, interaction data) may be stored as part of block 320. As mentioned earlier, this data may be used as part of block 306 to calculate the click-through rate (or other engagement rate).

Figure 4A:
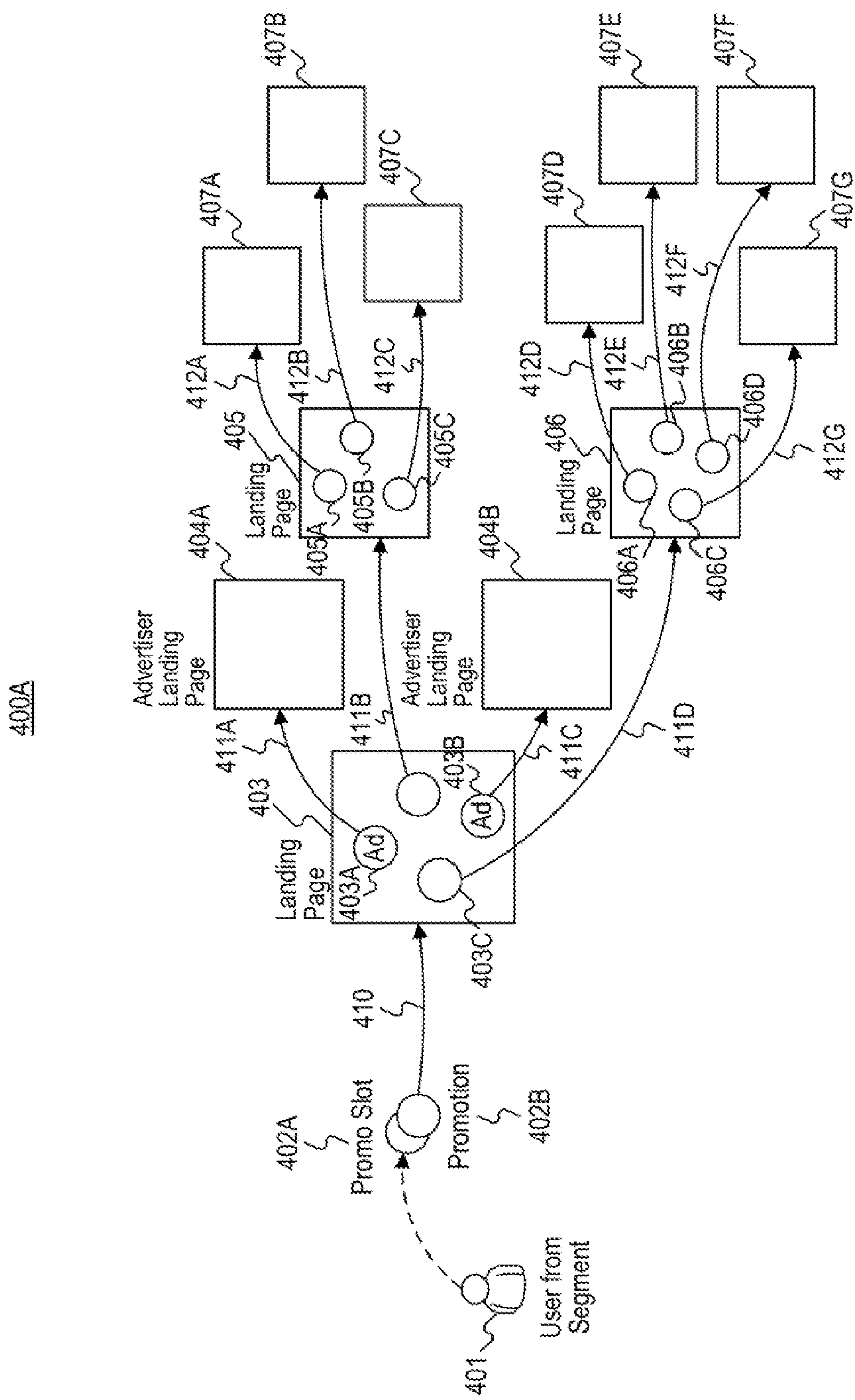
FIG. 4A is a diagram of a Valuation System 400A as represented through an exemplary network of landing pages, advertisements/content, and advertiser landing pages, consistent with disclosed embodiments of the present disclosure.

FIG. 4A depicts a Valuation Process 400A that is represented through an exemplary network of landing pages, advertisements/content, and advertiser landing pages, consistent with disclosed embodiments of the present disclosure. As mentioned previously with respect to Modules 206-210 of FIG. 2, and blocks 308 and 310 of FIG. 3, a valuation process such as process 400A may be implemented for a specific combination of time, Promotion 402B (which links to Landing Page 403), User Segment 401 (of which the illustrated user is a part), and Promotion Slot 402A (e.g., a position on a Landing Page for displaying promotions). Valuation Process 400A, in some embodiments, determines the monetary value of that particular combination. In some embodiments, the valuation process depicted in 400A is performed recursively and comprises the following:

$$v(t,i,j,k)=p(t,i,j,k)*v_{lp(i)}(t,k),$$

wherein:

t represents the time;

represents Promotion 402B;

j represents Promotion Slot 402A;

k represents User Segment 401;

p(t,i,j,k) represents the click probability based on time t, Promotion 402B, Promotion Slot 402A, and User Segment 401; and $v_{lp(i)}(t, k)$ represents the value of the particular landing page lp(i), for time t and user segment k.

In some embodiments, $v_{lp(i)}(t, k)$ may be a weighted sum of v(t,i',j',k) for all Promotions i' and all Promotion Slots j', such that the value of the Landing Page lp(i)—which promotion i links to—may be defined by the value of the promotions displayed on the Landing Page lp(i). The value of the promotions displayed on the Landing Page lp(i), in turn, may be determined based on the values of the Landing Pages to which each of the promotions on Landing Page lp(i) and their CTR/performance metric are linked to. Thus, in some embodiments, one having ordinary skill in the art would recognize that the calculation is recursive.

In other embodiments, Valuation Process 400A may be implemented in another manner. In some embodiments, an editor, user, or another operator of the exemplary systems and methods may wish to modify the value of Landing Page 403 and/or Promotion 402B. In accounting for these modifications, another formula for determining a Valuation may be given by:

$$v(t,i,j,k)=p(t,i,j,k)*[v_{lp(i)}(t,k)-u_{lp(i)}(t,k)]-u_{promo(i)}(t,j,k);$$

wherein the above key applies; and in addition:

$u_{lp(i)}(t,k)$ represents an adjustment to the value for the landing page; and $u_{promo(i)}(t,j,k)$ represents an adjustment to the value for each Ad/Content Promotion.

The above formula allows for exploration/learning operations, as well as meeting various advertiser/publisher goals (e.g., traffic levels, budgets, or the like).

Figure 4B:
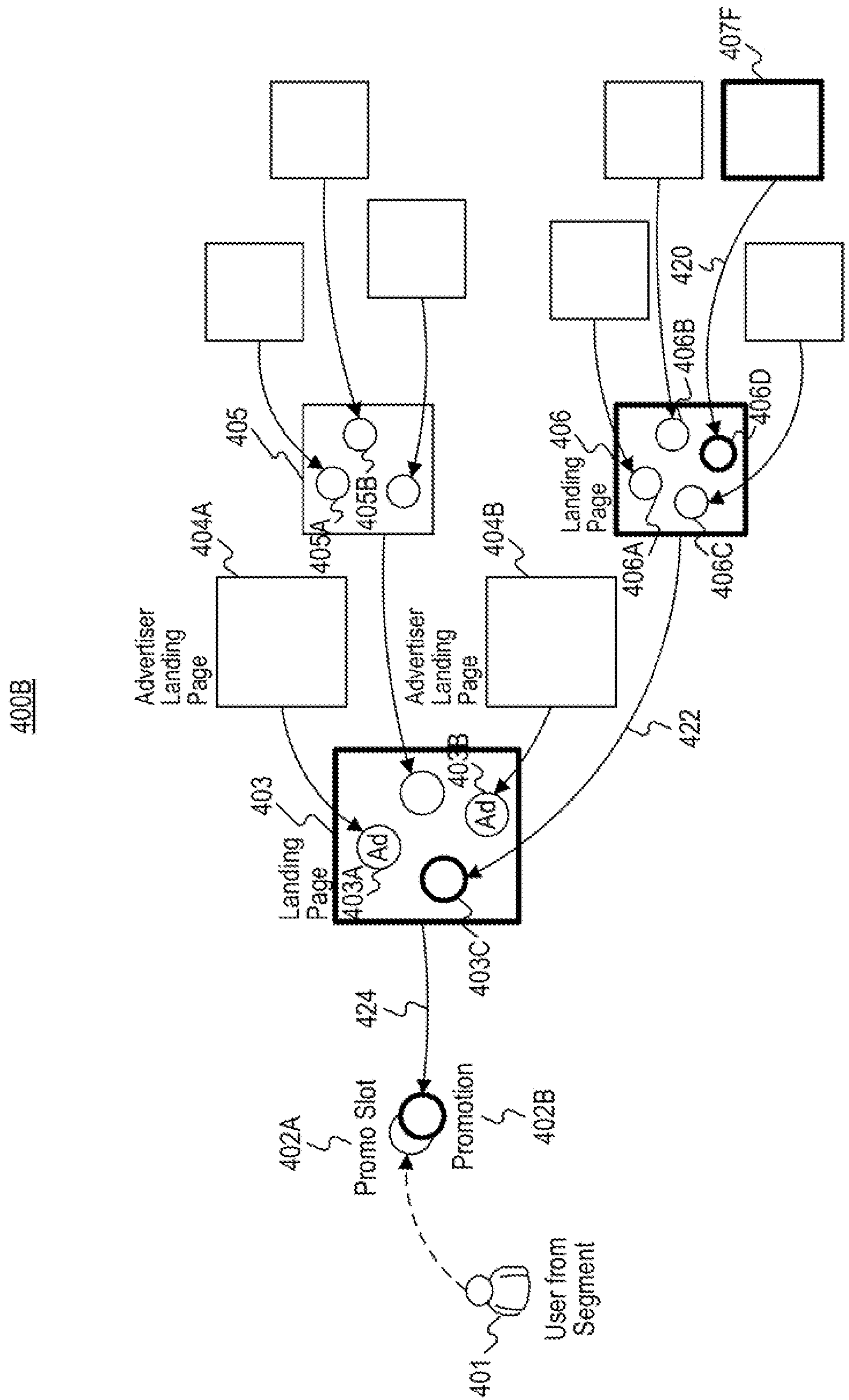
FIG. 4B is a diagram of a Valuation Signal Flow 400B as represented through an exemplary network of landing pages, advertisements/content, and advertiser landing pages, consistent with disclosed embodiments of the present disclosure.

FIG. 4B is a diagram of a Valuation Signal Flow 400B as represented through an exemplary network of landing pages, advertisements/content, and advertiser landing pages, consistent with disclosed embodiments of the present disclosure. As described below, FIG. 4B represents an exemplary operation of Valuation Process 400A of FIG. 4A.

The steps represented by FIG. 4B enable the identification of a piece of content and the monetization of that content based on the estimation of it being a high-performing piece of content. Item 407F (which may be a Landing Page, Advertiser Landing Page, or the like) can first be identified as a high-performing piece of content.

In step 420, Item 407F may be exposed to users in the form of promotion 406D. That is, Item 407F may be linked to by Promotion 406D on Landing Page 406, such that any users visiting Landing Page 406 may see Promotion 406D that links to Item 407F. The valuation and estimation systems and methods described with respect to FIGS. 2 and 3 then may operate to estimate a higher-than-average click probability for that particular promotion on Landing Page 406. The above described methods and systems may result in a high valuation of Item 407F, because of the higher-than-average click probability.

Because of its high valuation, Item 407F may then be displayed to more users because its high value will lead to it "winning" the market clearing process. In turn, this may lead to the valuation increasing further. Note that the previously-mentioned valuation methods may, in some embodiments, be recursive; that is, the value of a particular promotion may be influenced based on the landing page that the promotion links to, as well as the other promotions that are linked to by that landing page, etc. So, in step 422, while the probability to reach Item 407F from Landing Page 403 may not increase as a result of being highly-valued, the value of Promotion 403C that points to Landing Page 406 (which contains Promotion 406D, that links to Item 407F) may increase based on the increased value of 407F, because Promotion 403C indirectly leads to Item 407F.

Figure 5:
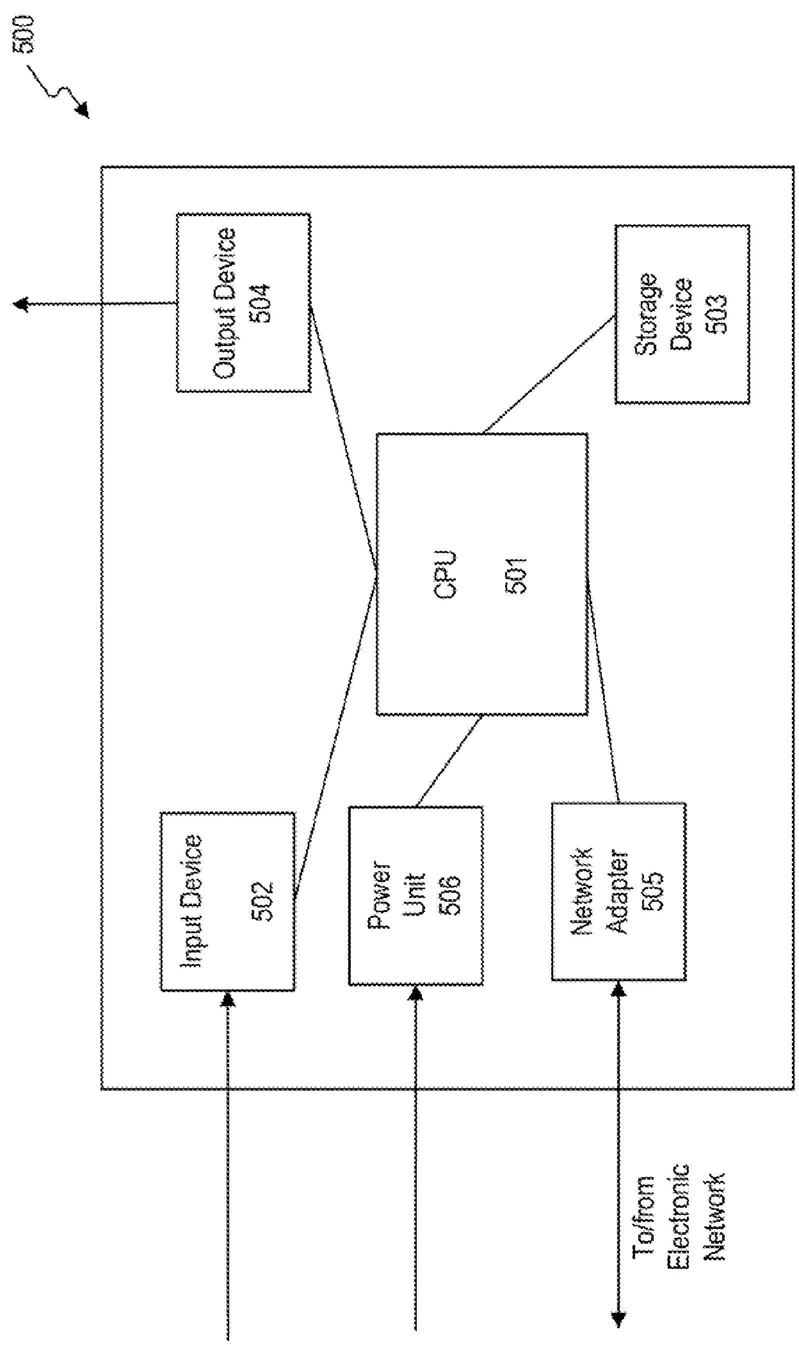
FIG. 5 is a diagram of an exemplary computer system 500 for implementing embodiments consistent with the present disclosure.

FIG. 5 depicts a diagram of an exemplary computer system 500 for implement embodiments consistent with the present disclosure. Variations of computer system 500 may be used for implementing client devices 120, advertiser servers 124, publisher web servers 104, and/or the ContentLearn system 102. As shown in FIG. 5, exemplary computer system 500 may include a central processing unit 501 for managing processing of data. Computer system 500 may also include storage device(s) 503. The device(s) that make up storage device 503 may be in the form of optical, magnetic, signal, or any other type of storage device. Computer system 500 may also include network adapter(s) 505. Network adapter(s) 505 may allow computer system 500 to connect to electronic networks, such as the Internet, a local area network, a wide area network, a cellular network, a wireless network, or any other type of network. Computer system 500 may also include power unit(s) 506, which may enable computer system 500 and its component parts to operate fully.

In some embodiments, computer system 500 may also include input device(s) 502, which receive input from users and/or other equipment or devices. Such equipment or devices may include, but are not limited to, keyboards, mice, trackballs, trackpads, scanners, cameras, and other devices which connect via Universal Serial Bus (USB), serial, parallel, infrared, wireless, wired, or other connections. Computer system 500 also includes output device(s) 504, which transmit data to users and/or other equipment or devices. Such equipment or devices may include, but are not limited to, computer monitors, televisions, screens, projectors, printers, plotters, and other recording/displaying devices which connect via wired or wireless connections. Additionally, while the drawing in FIG. 5 displays all components connected to CPU 501, other connections and configurations are possible.

In this disclosure, various embodiments have been described with reference to the accompanying drawings and embodiments. It will, however, be evident that various modifications and changes may be made thereto, and additional embodiments may be implemented, without departing from the present disclosure. The specification and drawings are accordingly to be regarded in an illustrative rather than restrictive sense.

For example, advantageous results may still be achieved if steps of the disclosed methods were performed in a different order and/or if components in the disclosed systems were combined in a different manner and/or replaced or supplemented by other components. Other implementations are also within the scope of the present disclosure.

What is claimed is:

1. A computer-implemented method of selecting a promotion of at least one of an advertisement or content, the method comprising:

for at least one first promotion of a set of promotions:

calculating, using at least one processor, an engagement metric for the first promotion, the engagement metric being based on the first promotion being displayed at a specific time, in a specific promotion slot on a web page, and for a specific user segment;

recursively calculating, using the at least one processor, a value of a first content linked to by the first promotion, the recursively calculating including:

calculating an engagement metric for at least one second promotion displayed with the first content, calculating a value for each second content linked to by each second promotion;

calculating a value for each second promotion by combining the engagement metric of each second promotion with the respective value of each of second content linked to by each second promotion; and determining the value of the first content based on a weighted value of each second promotion, wherein the weighted value is associated with at least one of click volume or time spent on web page;

determining the valuation of the first promotion, based on the engagement metric of the first promotion and the value of the first content;

selecting, a promotion from the set of promotions, based at least on the valuation of the at least one first promotion;

inserting the selected promotion into the promotion slot on a web page; and delivering the web page with the selected promotion to a client device associated with a user in the user segment.

2. The method of claim 1, further comprising:

receiving engagement data based on user interaction with the selected promotion; and recalculating at least one engagement metric using the engagement data.

3. The method of claim 1, further comprising:

receiving information concerning adjustments to at least one of the valuation of the first promotion or the valuation of the first content, wherein the information concerning adjustments is received from one of a human operator or an automated system.

4. The method of claim 1, wherein the engagement metric for the promotion is calculated using at least one of historical impression data or click volume data.

5. The method of claim 1, wherein the value of a landing page is calculated based on market clearing prices for all promotions present on the landing page.

6. The method of claim 1, wherein the engagement metric of promotions associated with the first content are determined based on at least one of time, promotion slot, or user segment.

7. A computer-implemented system of selecting a promotion of at least one of an advertisement or content, the system comprising:
a memory device that stores a set of instructions;
at least one processor that executes the set of instructions and that is configured to:
for at least one first promotion of a set of promotions:
calculate, using at least one processor, an engagement metric for the first promotion, the engagement metric being based on the first promotion being displayed at a specific time, in a specific promotion slot on a web page, and for a specific user segment;
calculate, using the at least one processor, a value of a first content linked to by the first promotion, by:
calculating an engagement metric for at least one second promotion displayed with the first content,
calculating a value for each second content linked to by each second promotion;
calculating a value for each second promotion by combining the engagement metric of each second promotion with the respective value of each second content linked to by each second promotion; and
determining the value of the first content based on a weighted value of each second promotion, wherein the weighted value is associated with at least one of click volume or time spent on web page;
determine the valuation of the first promotion, based on the engagement metric of the first promotion and the value of the first content; and
select a promotion from the set of promotions, based at least on the valuation of the at least one first promotion;
insert the selected promotion into the promotion slot on a web page; and
deliver the web page with the selected promotion to a client device associated with a user in the user segment.

8. The system of claim 7, wherein the at least one processor is further configured to:
receive engagement data based on user interaction with the selected promotion; and
recalculate at least one engagement metric using the engagement data.

9. The system of claim 7, wherein the at least one processor is further configured to receive information concerning adjustments to at least one of the valuation of the first promotion or the valuation of the first content, wherein the information concerning adjustments is received from one of a human operator or an automated system.

10. The system of claim 7, wherein the engagement metric for the promotion is calculated using at least one of historical impression data or click volume data.

11. The system of claim 7, wherein the value of a landing page is calculated based on market clearing prices for all promotions present on the landing page.

12. The system of claim 7, wherein the engagement metric of promotions associated with the first content are determined based on at least one of time, promotion slot, or user segment.

13. A non-tangible computer-readable medium containing instructions that, when executed on at least one processor, are operable to:
for at least one first promotion of a set of promotions:

calculating, using at least one processor, an engagement metric for the first promotion, the engagement metric being based on the first promotion being displayed at a specific time, in a specific promotion slot on a web page, and for a specific user segment;
calculating, using the at least one processor, a value of a first content linked to by the first promotion, by:
calculating an engagement metric for at least one second promotion displayed with the first content,
calculating a value for each second content linked to by each second promotion;
calculating a value for each second promotion by combining the engagement metric of each second promotion with the respective value of each second content linked to by each second promotion; and
determining the value of the first content based on a weighted value of each second promotion, wherein the weighted value is associated with at least one of click volume or time spent on web page;
determining the valuation of the first promotion, based on the engagement metric of the first promotion and the value of the first content; and
selecting a promotion from the set of promotions, based at least on the valuation of the at least one first promotion;
inserting the selected promotion into the promotion slot on a web page; and
delivering the web page with the selected promotion to a client device associated with a user in the user segment.

14. The medium of claim 13, wherein the instructions are further operable to cause the at least one processor:
receive engagement data based on user interaction with the selected promotion; and
recalculate at least one engagement metric using the engagement data.

15. The medium of claim 13, wherein the instructions are further operable to:
receive information concerning adjustments to at least one of the valuation of the first promotion or the valuation of the first content, wherein the information concerning adjustments is received from one of a human operator or an automated system.

16. The medium of claim 13, wherein the engagement metric for the promotion is calculated using at least one of historical impression data or click volume data.

17. The medium of claim 13, wherein the value of a landing page is calculated based on market clearing prices for all promotions present on the landing page.

18. The medium of claim 13, wherein the engagement metric of promotions associated with the first content are determined based on at least one of time, promotion slot, or user segment.

19. A method for calculating a value of a promotion, comprising:
for each individual content in a set of content having at least one promotion displayed thereon:
calculating the value of each promotion on the individual content, as a function of at least one engagement metric associated with the promotion and the value of a second individual content that is linked to by the promotion displayed on the individual content, by:
determining the engagement metric associated with the promotion displayed on the individual content;

determining the value of the second individual content by:

recursively determining at least two sets, each set comprising an engagement metric and a value, each set associated with at least one second promotion displayed with the second individual content; and determining the value of the individual content by combining a weighted value of each promotion displayed with the individual content, wherein the weighted value is associated with at least one of click volume or time spent on web page;

outputting the value of the individual content to a market clearing module for entering a first promotion into a market clearing process;

receiving, from an automated content serving module, engagement information related to one of the promotions for the individual content;

and recalculating, the value of one of the promotions on the individual content based on the engagement information, each engagement metric associated with a particular promotion being based on the particular promotion being displayed in a specific promotion slot on a web page delivered to a client device associated with a user at a particular time.

20. The method of claim 19, wherein determining the value of the individual content based on the value of each promotion further comprises one of:

determining the sum of the value of each promotion located on the individual content, or determining the sum of the products of the value of each promotion located on the individual content and the probability that a particular user will interact with that promotion.

21. The method of claim 19, further comprising:

receiving information concerning second adjustments to at least the valuation of the individual content, wherein the information concerning second adjustments is received from an automated system.

22. The method of claim 19, wherein the value of each promotion on the individual content is based on the engagement metric of the promotion;

wherein the value is further based on at least one of time, promotion slot, or user segment; and wherein the engagement metric is calculated using at least one of historical impression data or click volume data.

23. A non-tangible computer-readable medium containing instructions that, when executed on at least one processor, are operable to:

for each individual content in a set of content having at least one promotion displayed thereon:

calculate the value of each promotion on the individual content, as a function of at least one engagement metric associated with the promotion and the value of a second individual content that is linked to by the promotion displayed on the individual content, by determining the engagement metric associated with the promotion displayed on the individual content; and determining the value of the second individual content by:

recursively determining at least two sets, each set comprising an engagement metric and a value, each set associated with at least one second promotion displayed with the second individual content; and determining the value of the individual content by combining a weighted value of each promotion displayed with the individual content, wherein the weighted value is associated with at least one of click volume or time spent on web page;

output the value of the individual content to a market clearing module for entering a first promotion into a market clearing process;

receive, from an automated content serving module, engagement information related to one of the promotions for the individual content; and recalculate, the value of one of the promotions on the individual content based on the engagement information, each engagement metric associated with a particular promotion being based on the particular promotion being displayed in a specific promotion slot on a web page delivered to a client device associated with a user at a particular time.

24. The medium of claim 23, wherein determining the value of the individual content based on the value of each promotion further comprises one of:

determining the sum of the value of each promotion located on the individual content, or determining the sum of the products of the value of each promotion located on the individual content and the probability that a particular user will interact with that promotion.

25. The medium of claim 23, wherein the instructions are further operable to:

receive information concerning second adjustments to at least the valuation of the individual content, wherein the information concerning second adjustments is received from an automated system.

26. The medium of claim 23, wherein the value of each promotion on the individual content is based on the engagement metric of the promotion;

wherein the value is further based on at least one of time, promotion slot, or user segment; and wherein the engagement metric is calculated using at least one of historical impression data or click volume data.

27. The method of claim 1, wherein recursively calculating the value of the first content linked to by the first promotion further comprises:

calculating a valuation for each second promotion by multiplying each engagement metric of each second promotion for the first content with the respective value of each second content linked to by each second promotion; and summing each valuation of each second promotion to produce the value of the first content.

28. The system of claim 7, wherein recursively calculating the value of the first content linked to by the first promotion comprises:

calculating a valuation for each second promotion by multiplying each engagement metric of each second promotion for the first content with the respective value of each second content linked to by each second promotion; and summing each valuation of each second promotion to produce the value of the first content.

29. The medium of claim 13, wherein recursively calculating the value of the first content linked to by the first promotion further comprises:

calculating a valuation for each second promotion by multiplying each engagement metric of each second promotion for the first content with the respective value of each second content linked to by each second promotion; and summing each valuation of each second promotion to produce the value of the first content.

* * * * *